United States Patent
Sauder et al.

(10) Patent No.: US 9,173,339 B2
(45) Date of Patent: Nov. 3, 2015

(54) SYSTEM AND METHOD FOR DETERMINING PROPER DOWNFORCE FOR A PLANTER ROW UNIT

(75) Inventors: Derek A. Sauder, Tremont, IL (US);
Tim A. Sauder, Tremont, IL (US);
Justin L. Koch, Deer Creek, IL (US);
Phil D. Baurer, Tremont, IL (US)

(73) Assignee: Precision Planting LLC, Tremont, IL (US)

( * ) Notice: Subject to any disclaimer, the term of this patent is extended or adjusted under 35 U.S.C. 154(b) by 703 days.

(21) Appl. No.: 12/679,710

(22) PCT Filed: Jan. 7, 2008

(86) PCT No.: PCT/US2008/050427
§ 371 (c)(1),
(2), (4) Date: Mar. 24, 2010

(87) PCT Pub. No.: WO2009/042238
PCT Pub. Date: Apr. 2, 2009

(65) Prior Publication Data
US 2010/0198529 A1  Aug. 5, 2010

Related U.S. Application Data

(60) Provisional application No. 60/975,332, filed on Sep. 26, 2007.

(51) Int. Cl.
*G01L 1/00* (2006.01)
*G06F 19/00* (2011.01)
(Continued)

(52) U.S. Cl.
CPC .............. *A01C 7/205* (2013.01); *A01B 63/002* (2013.01); *A01B 63/111* (2013.01);
(Continued)

(58) Field of Classification Search
CPC .......... A01C 7/205; A01C 7/00; A01C 7/203; A01B 63/002; A01B 63/111; A01B 63/114; Y10S 111/90; Y10S 111/903
See application file for complete search history.

(56) References Cited

U.S. PATENT DOCUMENTS 3,658,133 A  4/1972  Sweet et al.
4,009,668 A  3/1977  Brass et al.
(Continued)

FOREIGN PATENT DOCUMENTS

EP  0372901 B1  2/1994
WO  2008008345 A2  1/2008
(Continued)

OTHER PUBLICATIONS

ME 280 Senior Design; Row Unit Downforce Measurement System; 3D Consulting; pp. 1-24; May 1999.

*Primary Examiner* — Janet Suglo
*Assistant Examiner* — L. Anderson
(74) *Attorney, Agent, or Firm* — Thomas J. Oppold; Larkin Hoffman Daly & Lindgren, Ltd.

(57) ABSTRACT

A system and method for determining the appropriate downforce on an agricultural planter row unit that minimizes soil compaction while maintaining desired furrow depth. A load sensor is disposed to generate a load signal corresponding to loading on a depth regulation member of the row unit. In one method a load margin is calculated based on a minimum detected load value. In another method, a load margin is derived through a statistical analysis of the detected load values. The load margin calculated or derived by any of the methods is indicative of the amount of supplemental down force that should be increased or decreased to bring the load margin toward zero. A ground contact parameter may also be used in connection with the load margin to provide further confidence on the proper amount of downforce required to ensure furrow depth while minimizing soil compaction.

47 Claims, 9 Drawing Sheets

(51) Int. Cl.
  *G06F 17/18* (2006.01)
  *A01C 7/20* (2006.01)
  *A01B 63/111* (2006.01)
  *A01B 63/114* (2006.01)
  *A01C 7/00* (2006.01)
  *A01B 63/00* (2006.01)

(52) U.S. Cl.
  CPC ............... *A01B 63/114* (2013.01); *A01C 7/00* (2013.01); *A01C 7/203* (2013.01); *Y10S 111/90* (2013.01); *Y10S 111/903* (2013.01)

(56) References Cited

U.S. PATENT DOCUMENTS

| | | |
|---|---|---|
| 4,031,963 A | 6/1977 | Poggemiller et al. |
| 4,064,945 A | 12/1977 | Haney |
| 4,176,721 A | 12/1979 | Poggemiller et al. |
| 4,355,688 A | 10/1982 | Hamm et al. |
| 4,385,353 A | 5/1983 | Schneider |
| 4,413,685 A | 11/1983 | Gremelspacher et al. |
| 4,423,788 A | 1/1984 | Robinson, Jr. et al. |
| 4,461,355 A | 7/1984 | Peterson et al. |
| 4,522,066 A | 6/1985 | Kistler et al. |
| 4,766,962 A | 8/1988 | Frase |
| 4,913,070 A | 4/1990 | Morrison, Jr. |
| 5,160,055 A | 11/1992 | Gray |
| 5,163,518 A | 11/1992 | Foley |
| 5,234,060 A | 8/1993 | Carter |
| 5,348,101 A | 9/1994 | Fox et al. |
| 5,544,709 A | 8/1996 | Lowe et al. |
| 5,562,165 A | 10/1996 | Janelle et al. |
| 6,070,539 A | 6/2000 | Flamme et al. |
| 6,389,999 B1 | 5/2002 | Duello |
| 6,460,623 B1 | 10/2002 | Knussman et al. |
| 6,480,808 B1 | 11/2002 | Early et al. |
| 6,701,857 B1 | 3/2004 | Jensen et al. |
| 6,827,029 B1 | 12/2004 | Wendte |
| 6,935,253 B2 | 8/2005 | Murray et al. |
| 6,983,705 B1 | 1/2006 | Gust |
| 2003/0079162 A1 | 4/2003 | Sutton |
| 2008/0008271 A1* | 1/2008 | Lee et al. ............. 375/340 |
| 2008/0011208 A1 | 1/2008 | Martin |
| 2012/0050023 A1* | 3/2012 | Sauder et al. ............. 340/431 |

FOREIGN PATENT DOCUMENTS

| | | |
|---|---|---|
| WO | 2008008347 A2 | 1/2008 |
| WO | 2009042238 A1 | 4/2009 |

* cited by examiner

SYSTEM AND METHOD FOR DETERMINING PROPER DOWNFORCE FOR A PLANTER ROW UNIT

BACKGROUND

One challenge that a producer of agricultural crops faces when attempting to properly adjust the operating parameters of his planting equipment is the varying soil conditions frequently encountered during planting operations. Varying soil conditions result from differing soil types (sand, clay, or silt), differences in soil moisture, drainage and tillage practices or conditions throughout the field. In addition to varying soil conditions, different operating speeds may require different adjustments to be made to the equipment.

One operating parameter over which the operator has the most control for adjusting to varying soil conditions is the downforce applied to the planter row unit. There are two problems associated with improper downforce being applied to the planter row unit. The first problem is that excess downforce results in too much weight being carried by the depth regulating member (i.e., depth gauge wheels, skis, skids, runners etc.). Excessive weight can compact the soil surrounding the furrow and thereby inhibit proper development and growth of the roots and plant. Excessive downforce can also result in a planting depth that is too great with some types of furrow openers. The second problem is that insufficient downforce can result in a shallow furrow which can also detrimentally effect the yield as the seed may not be deep enough to have adequate moisture for proper germination.

It is generally understood that the total downforce acting on the row unit consists of the dead weight of the row unit plus the live weight of seed and/or insecticide carried upon the row unit, plus any supplemental downforce applied through the parallel arm linkage. Of the total down force for the row unit, the majority is used in forcing the opener disk(s) into the soil to the desired seeding depth. The remainder of the total down force is carried by the depth gauge wheels.

Several attempts have been made to develop a control system which measures or senses the load on the gauge wheels. One such system is disclosed in European patent EP0372901 to Baker (the "Baker '901 patent") which utilizes a displacement transducer or load cell to measure the average load on the gauge wheels over a period of time.

Another system is disclosed in U.S. Pat. No. 6,389,999 to Duello (the "Duello '999 patent) which discloses the use of a strain gauge or other sensor for measuring the average load on the gauge wheels over a period of time. The disclosure of the Duello '999 patent at least acknowledges that there will be frequent load shifts experienced by the load sensors. However, Duello '999 suggests that the loads signals should be filtered in order to avoid "constant, minute responses that may task and overwork the system." It should be understood, that when a signal is filtered as suggested by Duello '999, the resultant data trace will identify only the average value of the signal over the given time interval as opposed to identifying the actual detected signal peaks and valleys. The Duello '999 patent also suggests that some "change limit" must be exceeded before action is taken. Although it is unclear from the Duello specification, it is assumed that this change limit is a predetermined amount by which the load must change relative to the average before any action is to be taken.

Yet another system is disclosed in U.S. Pat. No. 6,701,857 to Jensen (the "Jenson '857 patent"). Jenson '857 discloses a depth control device that also measures the load on the gauge wheels where "readings are averaged and sampled every few seconds so as not to create an erratic reading." Jenson '857 speaks of a desired or predetermined load value (target load) input by the operator. A control algorithm regulates the downforce in an attempt to ensure the average downforce matches the target load as closely as possible.

Figure 2:
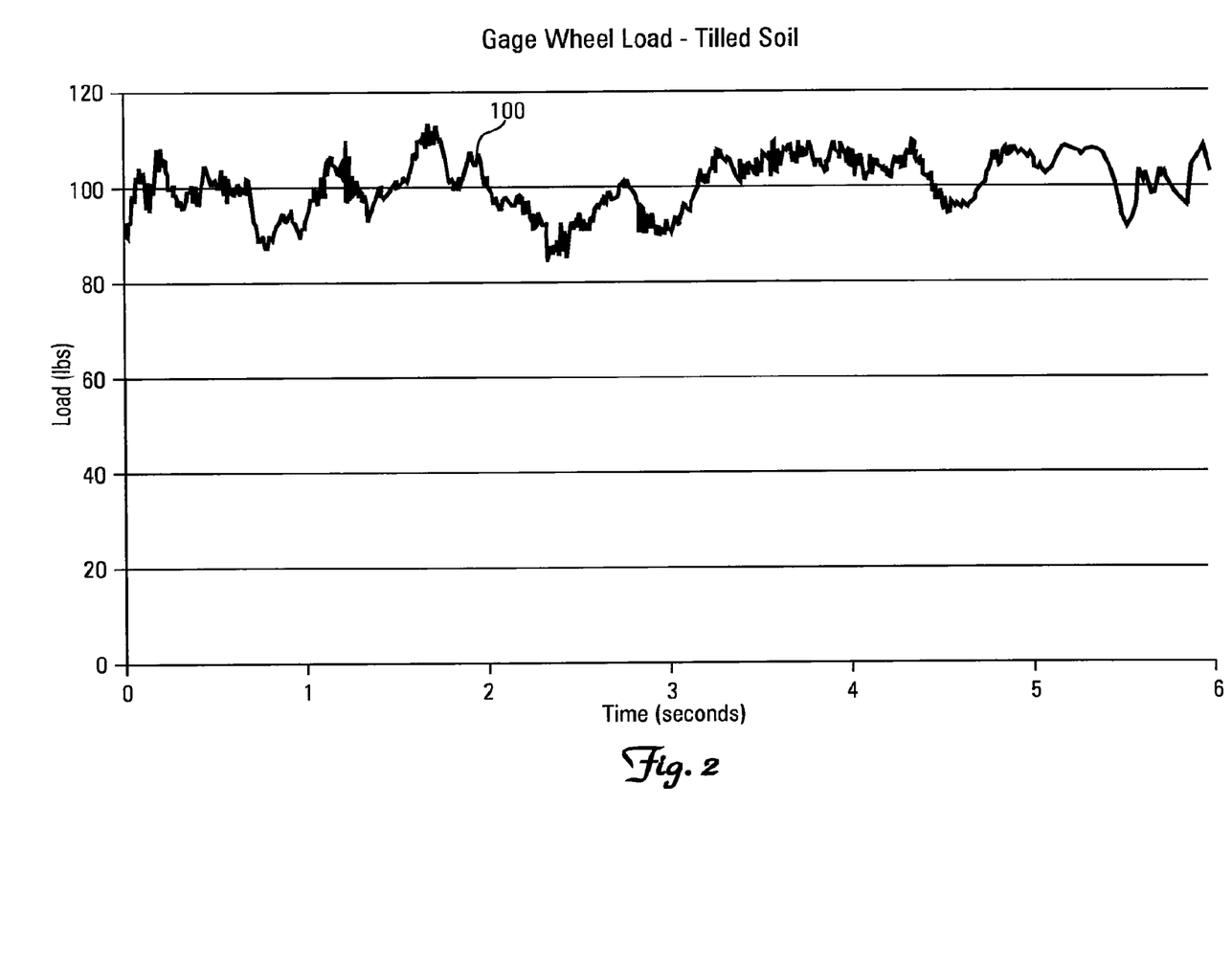
FIG. 2 is an example of a trace of a load signal experienced by a load sensor under highly tilled soil conditions.
Figure 3:
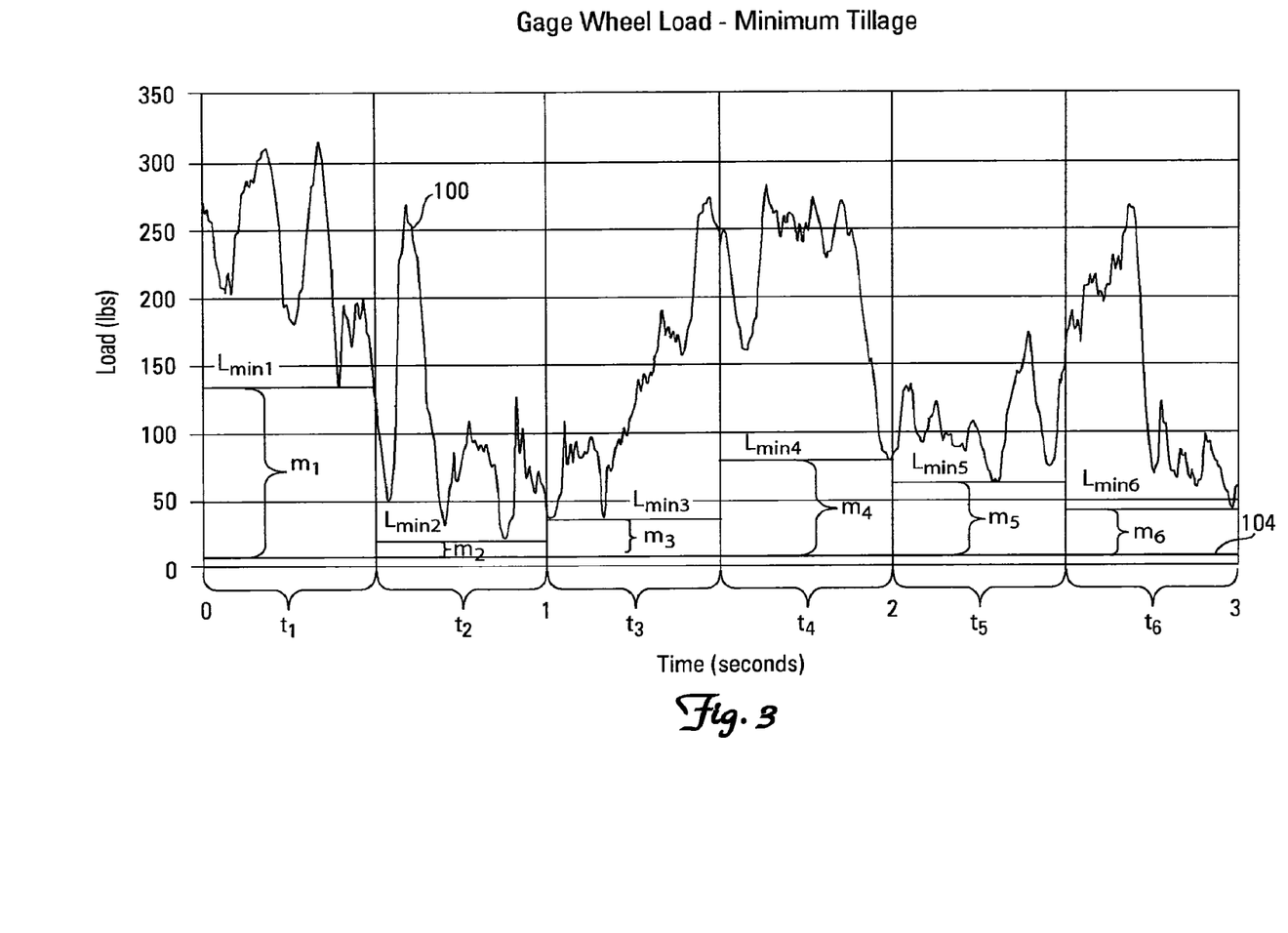
FIG. 3 is an example of a trace of a load signal experienced by a load sensor under minimum tilled soil conditions, and it further illustrates one method of determining a load margin in accordance with the present invention in which the minimum load is detected during a sampling period.

While each of the forgoing systems may perform their intended purpose, it should be recognized that not all soil conditions result in the same type of gauge wheel loadings. If the operator is required to select a target load, the selected target load may be too great (resulting in soil compaction) or too little (resulting in shallow furrows) depending on the changing soil conditions. For example, highly tilled soil will be very uniform as well as very compactable, resulting in very uniform load upon the gauge wheels throughout the field. By contrast, in no till or minimum tillage systems, the soil structure will vary dramatically throughout the field. FIG. 2 illustrates the load signal generated from actual planting conditions in a field which was highly tilled and had a uniform soil type. The average load was approximately 100 pounds and the signal deviated little from this value, never falling lower than 85 pounds or rising greater than 115 pounds. FIG. 3 illustrates the load signal from a minimum tillage field where the load was varying dramatically. The average load was approximately 150 pounds but dropped nearly to zero and rose as high as 300 pounds at times. These two scenarios show the different characteristics of gauge wheel loadings that prevent an operator from making the best determination of downforce setting based solely on average load alone. Thus, the aforementioned systems fail to provide the necessary information to the operator or an automatic control actuator to minimize excess soil compaction while at the same time avoiding loss of proper furrow depth.

The proper downforce for any given planting condition should be that amount of downforce required to maintain the desired furrow depth without imparting excessive compaction to the soil surrounding the furrow. Balancing these two criteria is difficult because, as explained above, minimizing compaction will tend to create a loss of furrow depth, whereas minimizing loss of furrow depth will tend to increase compaction. Accordingly, there is a need for a system and method for determining the proper downforce for planter row units that will ensure desired furrow depth while minimizing soil compaction.

DETAILED DESCRIPTION

Figure 1:
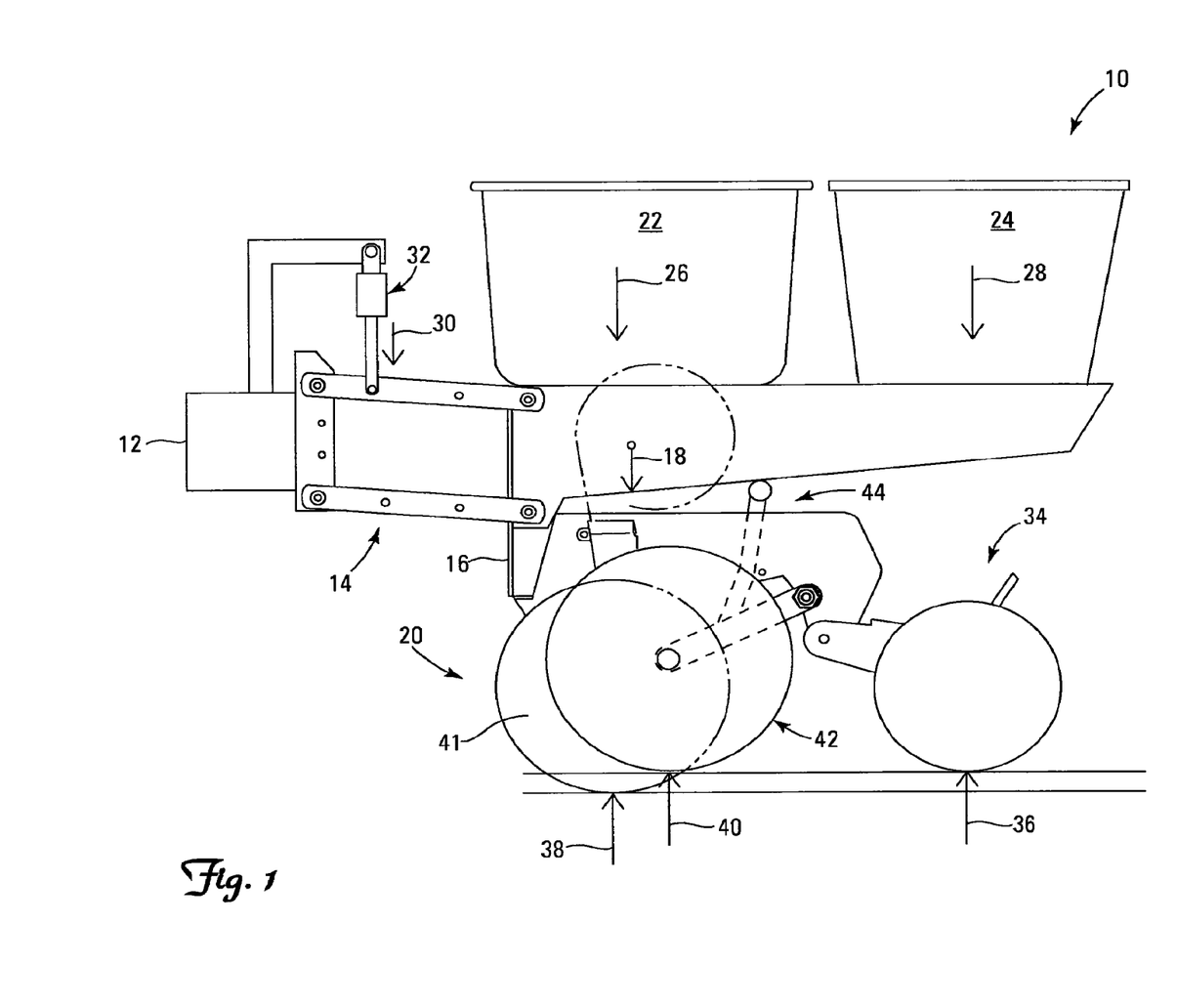
FIG. 1 illustrates a side elevation view of a typical planter row unit.

FIG. 1 illustrates a typical row unit 10 of a conventional planter such as the type disclosed in U.S. Pat. No. 4,009,668, incorporated herein in its entirety by reference. The row unit 10 is supported from the planter frame or toolbar 12 by a parallel arm linkage 14 extending between the toolbar 12 and the row unit frame 16. A dead load indicated by arrow 18 represents the dead load of the entire row unit, including the mass of the opener disk assembly 20 (including opener discs 41 and gauge wheels 42), frame 16, seed hopper 22, insecticide hopper 24, seed meter and seed tube, and the mass of any other attachments or devices supported by the row unit frame 16. In addition, a live load corresponding to the mass of the seed and insecticide stored within the hoppers 22, 24 are represented by arrows 26 and 28. It is also well understood that in some row unit designs, seed and insecticide are stored in a central hopper on the planter frame. Thus the live loads associated with a central-fill planter will be substantially less than for a conventional row unit with hoppers as shown in FIG. 1.

A supplemental downforce 30 is also shown acting on the parallel arms 14. The supplemental downforce 30 may act in a manner to either increase or decrease the total or overall downforce carried by the gauge wheels 42. The supplemental down force 30 may be applied by any suitable biasing means, including mechanical springs, pneumatic cylinders, or through hydraulic cylinders 32 as shown in FIG. 1. To achieve a static load balance, the dead load 18, the live loads 26, 28 and the supplemental downforce 30 is resisted by the reactionary forces exerted by the soil against the opener disk (opener disk load 38), the gauge wheels (the gauge wheel load 40) and the closing wheels (the closing wheel load 36).

As is well understood by those of ordinary skill in the art, the depth adjustment mechanism 44, is used to set the relative distance between the bottom of the opener disks 41 and the bottom surface of the gauge wheels 42, thereby establishing the depth of penetration of the opener disks 41 into the soil surface. The term "gauge wheels" is used interchangeably throughout this specification with "depth regulation member." Thus any recitation in this specification of such terms are to be understood as including any type of depth regulating member, whether gauge wheels, skis, skids, runners, etc. It is also assumed for purposes of this discussion that the opener disks 41 penetrate the soil to the desired predetermined depth set by the depth adjustment mechanism as long as the gauge wheel force 42 is greater than zero. If the gauge wheel force is zero or less, then it is assumed that the opener disks have not fully penetrated the soil to the desired preset depth.

The present invention provides a novel method for determining the proper downforce for a planter row unit to ensure desired furrow depth while minimizing soil compaction under the depth regulating members. To the accomplishment of the foregoing, a load sensor is disposed on the row unit to generate a load signal corresponding to loading on a depth regulation member. FIGS. 2 and 3 are examples of actual tracings of load signals generated by such a load sensor. The preferred load sensor used to generate load signals corresponding to loading on a depth regulation member of the row unit is of the type disclosed in co-pending PCT Application No. PCT/US08/50401,which is incorporated herein in its entirety by reference. It should be appreciated that any suitable means of generating load signals corresponding to loading on the depth regulating members of a row unit may be used in connection with the various methods of the present invention hereinafter described.

For example, the type of load sensors disclosed in Baker '901,Jensen '857,Duello '999 and/or as disclosed in U.S. Provisional Application 60/883,957 filed Jan. 8, 2007, each of which is incorporated herein in their entirety by reference, may also be suitable.

Referring to the tracing of the load signal 100, in FIG. 2, it can easily be seen that the total downforce on the row unit could be reduced by reducing the supplemental downforce 30 by approximately eighty pounds. Even with the reduction by eighty pounds, the resulting gauge wheel load 40 would never fall below approximately five pounds. Thus, it should be appreciated that an average load of approximately twenty pounds would likely be more than sufficient to ensure desired furrow depth while minimizing soil compaction. In FIG. 3, the average load 100 is approximately 150 pounds but the low values are near zero. As a result, in this case, the supplemental downforce cannot be reduced without the gauge wheel load 40 reaching zero and thereby compromising depth control. As previously stated, these two load sensor tracings demonstrate that proper downforce on the row unit cannot be determined based on an average of the load values over a sampling period.

Accordingly, under one method of the present invention, the minimum value of the load signal occurring during a sampling period is detected (as opposed to the average load value as disclosed in Baker '901, Jensen '857, Duello '999). Based on this minimum load value a load margin is calculated which is indicative of the amount of supplemental downforce that should be added or subtracted (as the case may be) so that the downforce on the depth regulating member is proximate a desired minimum load threshold 104 (discussed later).

One method of calculating a load margin is hereinafter provided. In FIG. 3, a load signal 100 spanning a time period of three seconds is illustrated. The load signal 100 has been broken into sampling periods (t) of approximately one-half second duration. For each sampling period (t), a minimum load value $L_{min}$ is identified. A minimum load threshold 104 is established either as a default value, an operator input parameter, or a parameter obtained from a GPS map of the field being planted. A load margin (m) is calculated for each sampling period (t) where:

$$m = L_{min} - \text{minimum load threshold 104}$$

Thus a margin (m) is calculated for each sampling period (t). The margin (m) represents the amount by which the supplemental downforce could be reduced while maintaining a load at least equal to the minimum load threshold 104 on the gauge wheels. Ideally, the calculated load margin should be at or near zero, thereby ensuring desired furrow depth while minimizing soil compaction. The calculated load margin may be displayed to the operator, stored in memory for additional computation later, and/or if the planter is equipped to automatically adjust supplemental downforce.

The minimum load threshold 104 is ideally a value slightly greater than zero in order to account for several factors. First, as previously identified, the preferred load sensor is of the type disclosed in PCT Application No. PCT/US08/50401 which utilizes a strain gauge. Strain gauges are subject to mechanical, thermal, and electrical drift over time such that a true zero load on the gauge wheels may result in a measured load of perhaps five pounds, for example. It is important to be able to determine whether the load on the gauge wheels has truly reached zero and thus a more reliable determination will be made if a minimum load threshold 104 is used which is greater than the amount of drift in the signal rather than comparing the signal to the value zero. Secondly, there may be times when a small amount of gauge wheel load is desirable from a mechanical standpoint to ensure that the opener disks are truly penetrating the soil to the desired depth as set by the depth adjustment mechanism. Thirdly, a minimum gauge wheel load is generally desirable from an agronomic standpoint to ensure that the sidewalls of the furrow are firmed enough to remain open without collapsing until the seed has been placed in the furrow. Based on the foregoing factors, it has been found that a load threshold value 104 of about five pounds but less than about twenty pounds typically produces the desired results. However, the minimum load threshold may be higher or lower (nearly zero) as deemed necessary or appropriate based on operator experience and soil conditions.

An alternative method of computing the load margin (m) takes into account the fact that a planter in operation is dynamic and that extremely short duration dips of the sensed gauge wheel load 40 do not necessarily mean that the row unit has lost desired furrow depth. At typical planting speeds of five mph, the row unit travels a linear distance of one inch in approximately eleven milliseconds. Thus, a row unit would have to travel several inches in order to make an appreciable change in depth of at least ⅛ inch. It is known from experimental data that the accelerations on a typical planter row unit rarely exceed one g-force (32.2 ft/sec$^2$). Thus, based on the equation: $D=½g\,t^2$ where D=⅛ inch and g=32.2 ft/sec$^2$, the time required for the furrow opening disks to move ⅛ inch is approximately twenty-five milliseconds. Accordingly, if the planter loses depth and rises upwards ⅛ inch and then returns to the desired planting depth, a total time of approximately 50 milliseconds (i.e., 25 milliseconds×2) will elapse where zero load is on the gauge wheels. Additionally, experiments have been performed that measured actual furrow depth simultaneously with gauge wheel load and it was found that a load on the gauge wheel of zero pounds for approximately forty milliseconds will result in a depth loss of less than 1/16 inch. Zero loads for durations of 200 milliseconds will result in a loss of depth of approximately ⅜ inch. Based on the above data, a critical time duration ($T_{critical}$) of about forty milliseconds is assumed which could result in an appreciable change in depth.

Figure 4:
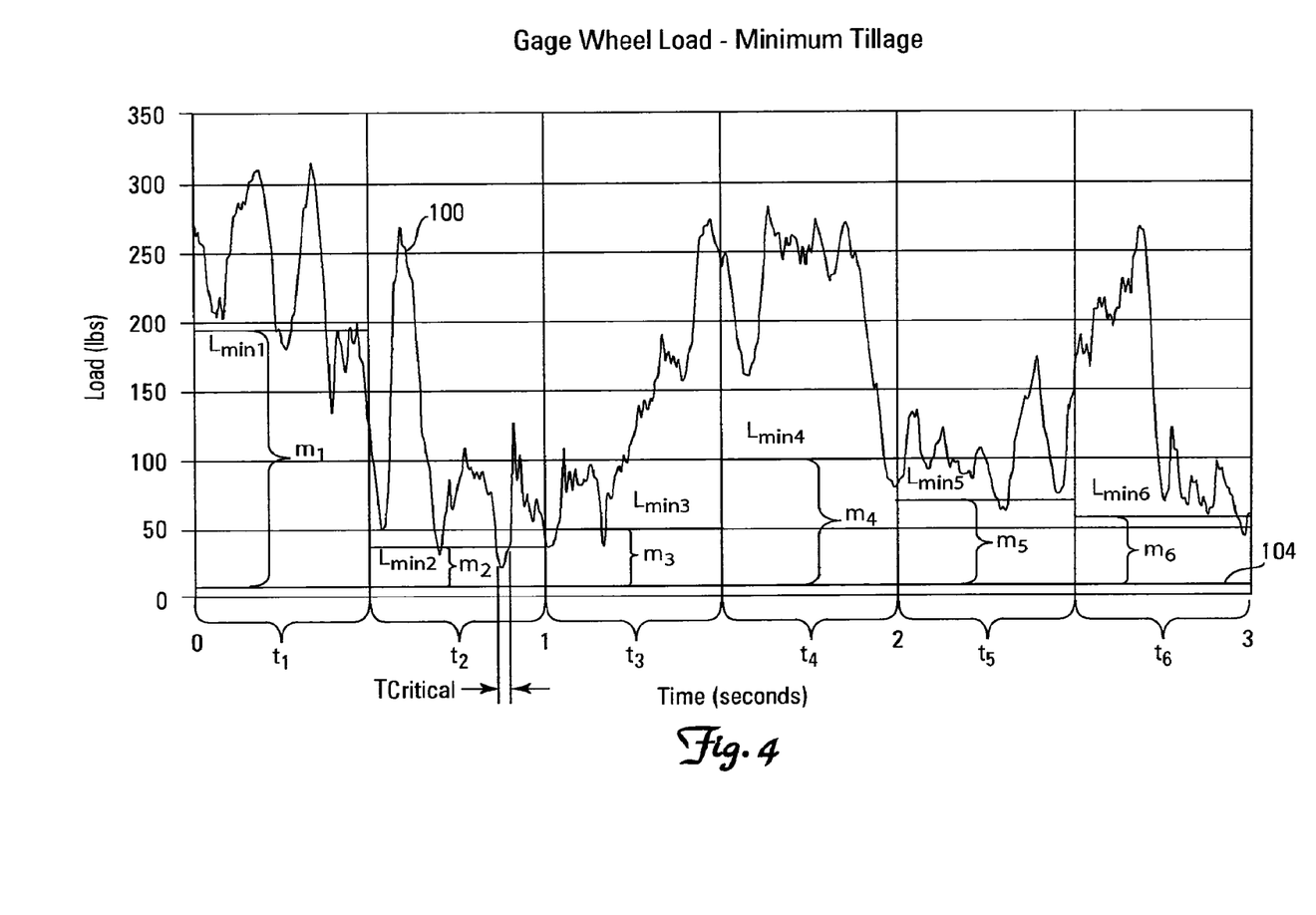
FIG. 4 is the same trace of a load signal as in FIG. 3 and illustrates another method of determining a load margin in accordance with the present invention in which the minimum load having a duration at least equal to a predefined critical time duration is detected during a sampling period.

FIG. 4 illustrates an alternative method for calculating load margin (m) where the minimum loads are defined as the minimum load value that is sustained for a time equal to or greater than $T_{critical}$. The load margin (m) is then calculated as before by subtracting the load threshold 104 from the minimum load $L_{min}$ having a duration at least equal to $T_{critical}$. By ignoring momentary dips or negative spikes in the load signal 100 that do not have a duration long enough to result in an appreciable loss of depth, compaction may be reduced even further without sacrificing furrow depth.

Figure 5:
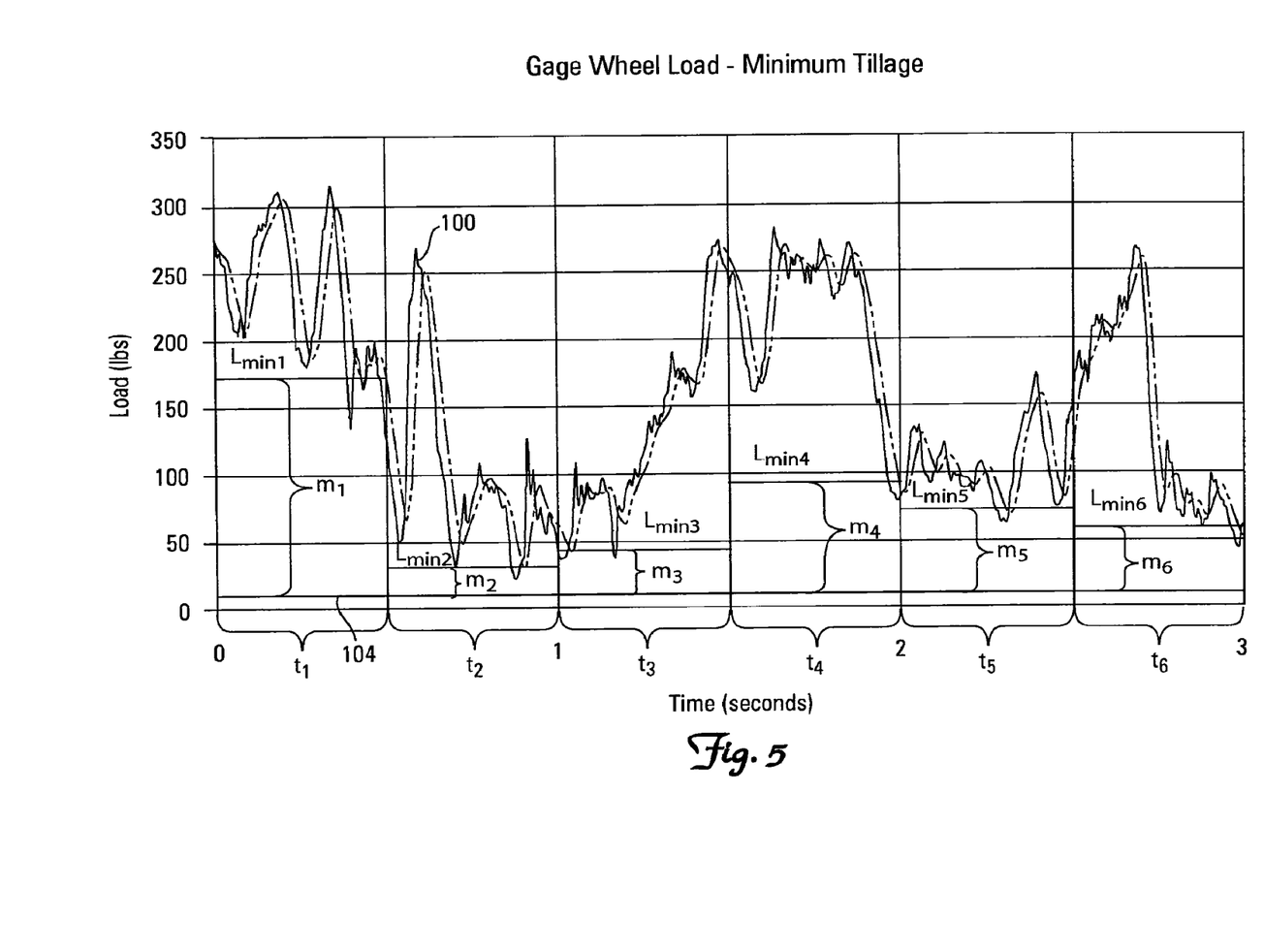
FIG. 5 is the same trace of a load signal as in FIG. 3 and illustrates another method of determining a load margin in accordance with the present invention in which the minimum filtered load is detected during a sampling period.

Yet another alternative method of determining the load margin (m) is illustrated in connection with FIG. 5 and is accomplished by applying a filter to the load signal 100 during the sampling period and then determining the load margin (m) in the same method as described in connection with FIG. 3. FIG. 5 illustrates the same load signal trace as FIG. 3. However, in FIG. 5, a forty millisecond low pass filter has been applied to the load signal 100. Many different methods of filtering a signal are recognized by those of skill in the art and any of such methods may be used in connection with the present invention. The load signal 100 is divided into one second sampling periods. The minimum value of the filtered signal within each sampling period is determined and then the margin (m) is calculated as the filtered minimum load $L_{min}$ minus the load threshold 104. This method results in improved control over the supplemental downforce as compared to other systems such as Duello '999 that filter the load signal to prevent overworking of the system while at the same time attempting to make control decisions of the supplemental downforce based upon the average load rather than the minimum load.

Alternatively, rather than calculating a load margin in relation to a minimum load threshold as described above, or rather then simply specifying an arbitrary load upon which supplemental downforce decisions are based as disclosed in Baker '901, Jensen '857, Duello '999, a statistical analysis of the monitored load signal may be employed to derive or infer a load margin that is indicative of whether supplemental downforce on the row unit should be increased or decreased so that, statistically, the desired furrow depth is ensured while minimizing soil compaction.

Figure 6:
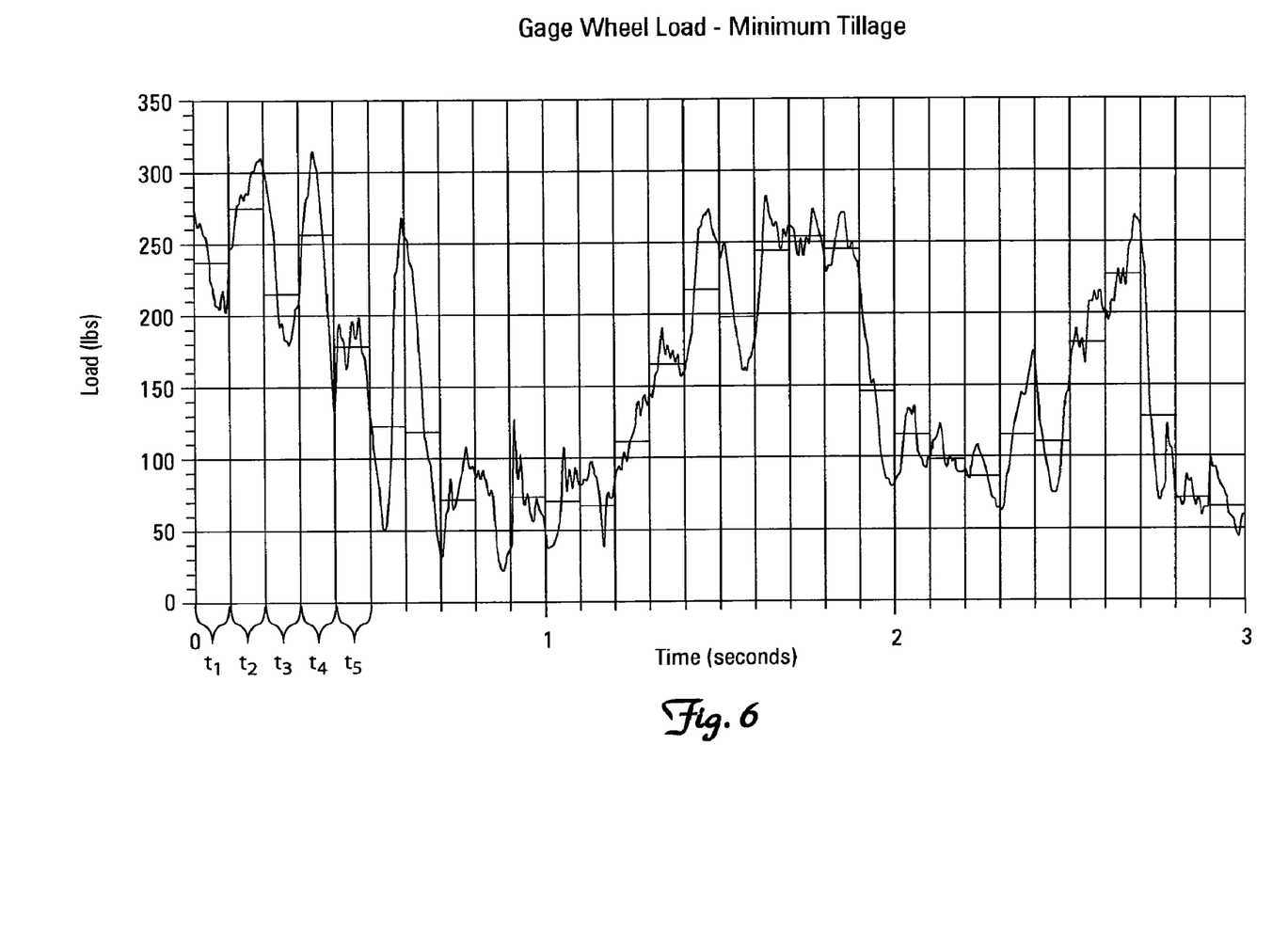
FIG. 6 is the same trace of a load signal as in FIG. 3 and illustrates another method of determining a load margin in accordance with the present invention in which a statistical analysis is used.

Referring to FIG. 6, the same load signal trace as in FIG. 3 is illustrated. However, rather than the ½ second sampling periods identified in FIG. 3, FIG. 6 is intended to illustrate three one-second sampling periods, with each one-second sampling period divided into 100 millisecond time intervals. In this method, the average of the load signal during a sampling period (e.g., one second) is first determined by storing into a buffer or other system memory the actual load values detected during each preset time interval (e.g., every 100 milliseconds). The average load for the sampling period is then calculated by adding the actual load values detected during that sampling period and dividing that sum by the number of time intervals that comprise the sampling period (which, using the foregoing examples, would be ten time intervals per the one second sampling period). The standard deviation of the load values comprising the monitored load signal 100 over the sampling period is then determined. A deviation factor is defined either by default or as an operator configurable parameter. The deviation factor represents the number of multiples or units of the standard deviation away from the calculated average load value for the sampling period that is desired to be used for calculating the margin (m). It has been found that a deviation factor having a value between about one and about five will give acceptable results, but a value of around 2.5 is a preferred deviation factor. The margin (m) is then computed by the formula:

$$m = (\text{calculated average load}) - ((\text{deviation factor}) \times (\text{standard deviation}))$$

As with the previous methods in which the load margin was calculated, the margin (m) derived using the foregoing statistical analysis is indicative of the amount of supplemental downforce on the row unit. The supplemental downforce should be increased or decreased accordingly, to bring the derived load margin toward zero thereby ensuring desired furrow depth while minimizing soil compaction.

It should be appreciated that all of the foregoing methods for calculating or deriving a load margin (m) were based on time periods ranging from a few seconds to fractions of a second. Instead of making downforce adjustment decisions based on such short time periods, it may be desirable to make downforce adjustment decisions based on a longer time periods, such as, for example, by determining the minimum load margin during a "pass" of the field being planted. A pass may be defined as the period beginning with the planter being lowered into working position at one end of the field until it is raised at the other end of the field to permit the operator to turn around for a new pass. Alternatively, a pass may be defined as traveling from one point in a field to another.

One reason why it may be desirable to determine the minimum load margin for a pass or some other extended time period is so the occasional aberrant soil condition encountered in the field does not cause immediate adjustment of the supplement down force. For example, it is not uncommon during planting operations to encounter variations in soil structure due to compaction by tire tracks, or due to an area where the soil was not properly tilled, or some other factor. Such changes in soil structure will result in sharp dips or negative spikes in the monitored load signal when the opening disks and gauge wheels pass over these areas of compacted soil. Thus, it may be desirable to exclude these negative spikes in the load signal 100 so that supplemental downforce adjustment decisions are not based on those short spikes in the load signal, which are representative of a very small percentage of the field area.

Accordingly, one method for excluding these load signal spikes while utilizing a statistical analysis to derive or infer a load margin is by applying a confidence factor to the load signals. The confidence factor preferably corresponds to the percent of time that the operator wants to ensure full furrow depth. The confidence factor preferably is between 95% and 99.9%. A default confidence factor of 99% is preferably assumed, but other values may be selected based on field conditions and operator experience. It should be understood that if a confidence factor of 100% is used, then the occasional soil irregularities that are encountered that cause sharp dips or negative spikes in the load signal will dominate the downforce setting for the entire pass or for whatever time span is being used for deciding when to adjust the supplemental downforce.

One method for deriving a load margin using a confidence factor is hereinafter described by way of example. A sampling period is presumed to be one second with each one-second sampling period divided into 100 millisecond time intervals. As identified above, the time span for which this method is to be used is preferably the amount of time to equal a pass, but may be any longer or shorter time period. In this example a time span of three minutes (i.e., 180 seconds) is assumed. As in the previous statistical method, an average of the load signal is calculated for each sampling period (i.e., every one second period). To determine the average load signals for a sampling period, the actual load values detected during each preset time interval (i.e., every 100 milliseconds) are stored in a buffer or system memory. The load values detected during the sampling period are then added and the sum is divided by the number of time intervals that comprise the sampling period (which, in this example, is ten time intervals per one second sampling period). The average calculated load values for each sampling period comprising the time span are stored in memory for later retrieval. Next an ignore count is determined by multiplying the number of sampling periods comprising the time span (i.e., 180 sampling periods) by the desired confidence factor (assume a 95% confidence factor) and then subtracting the product from the total count of sampling period occurrences (i.e., ignore count=180−(0.95×180) =9). The calculated average load values are then retrieved from memory and ordered by magnitude.

Figure 7:
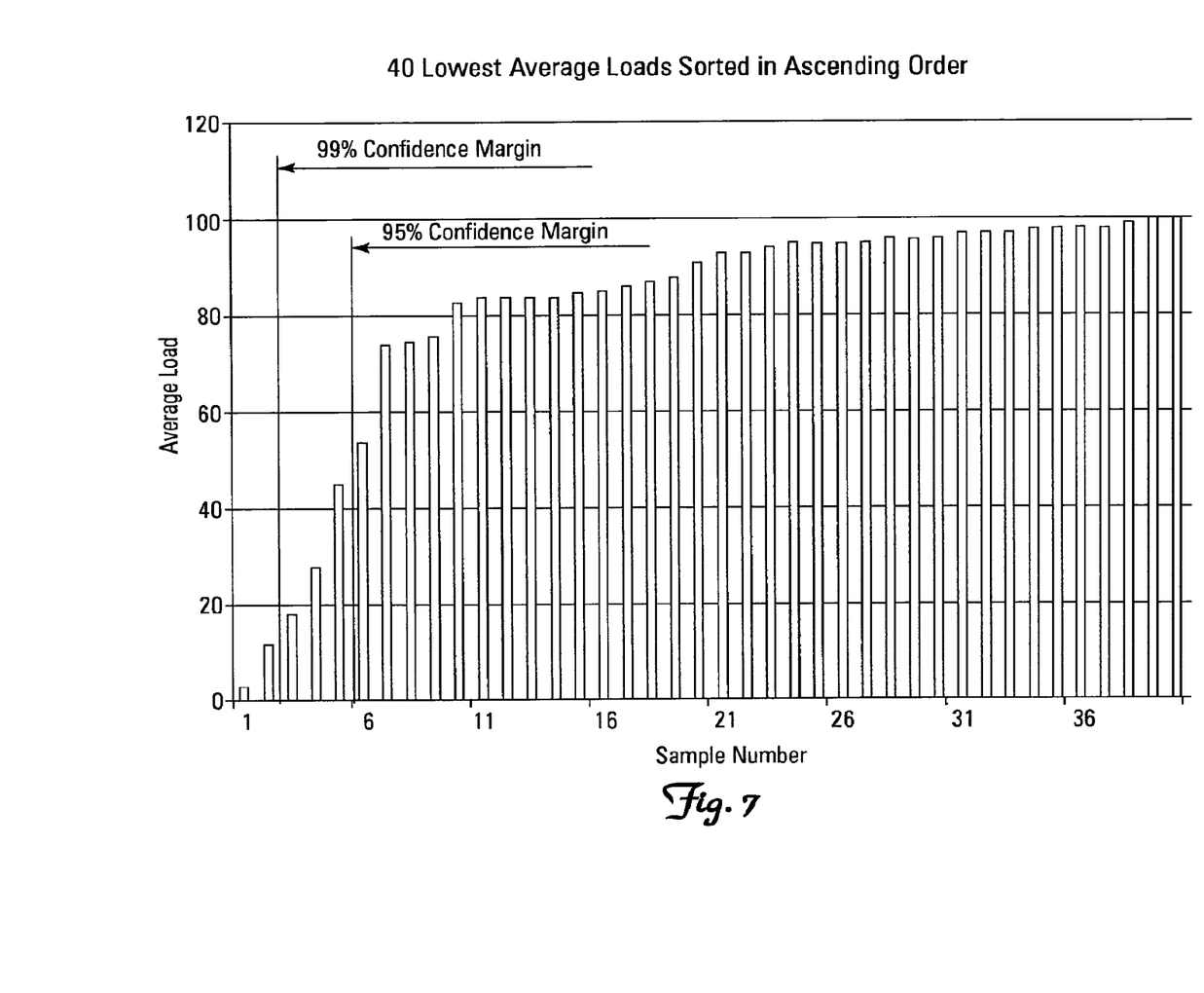
FIG. 7 is an example of a calculated load averages ordered by magnitude and illustrates another method of determining load margin based on another statistical method utilizing a confidence factor.

For example, referring to FIG. 7, a number of calculated average load values are ordered by magnitude along the horizontal axis. Next, beginning with the lowest in magnitude of the ordered calculated average load values, the number of ordered calculated average load values are counted from left to right (i.e., beginning with the lowest magnitude) until the ignore count is reached. The load margin that is the next lowest in magnitude after reaching the ignore count is selected as the load margin. Referring to FIG. 7, the first nine calculated average load values beginning from the left are ignored. Thus, the derived load margin will be about 52 pounds (i.e., the next lowest calculated average load value after meeting the ignore count of 5). If a confidence factor of 99% is selected, all other previous assumptions being the same, the ignore count will be 2 (i.e., ignore count=180−(0.99×180)=2). Thus, referring again to FIG. 7, the derived load margin will be 19 pounds (i.e., the next lowest calculated average load value after meeting the ignore count of 2).

In yet another statistical method for deriving a load margin using a confidence factor, and using the same assumption, an average of the load signal is again calculated for each sampling period (i.e., every one second period). As before, the actual load values for each preset time interval (i.e., every 100 milliseconds) is detected and stored in a buffer or system memory. The detected load values are added and the sum is divided by the number of time intervals that comprise the sampling period (i.e., ten time intervals per one second sampling period). The average calculated load values for each sampling period are stored in memory for later retrieval.

Figure 8:
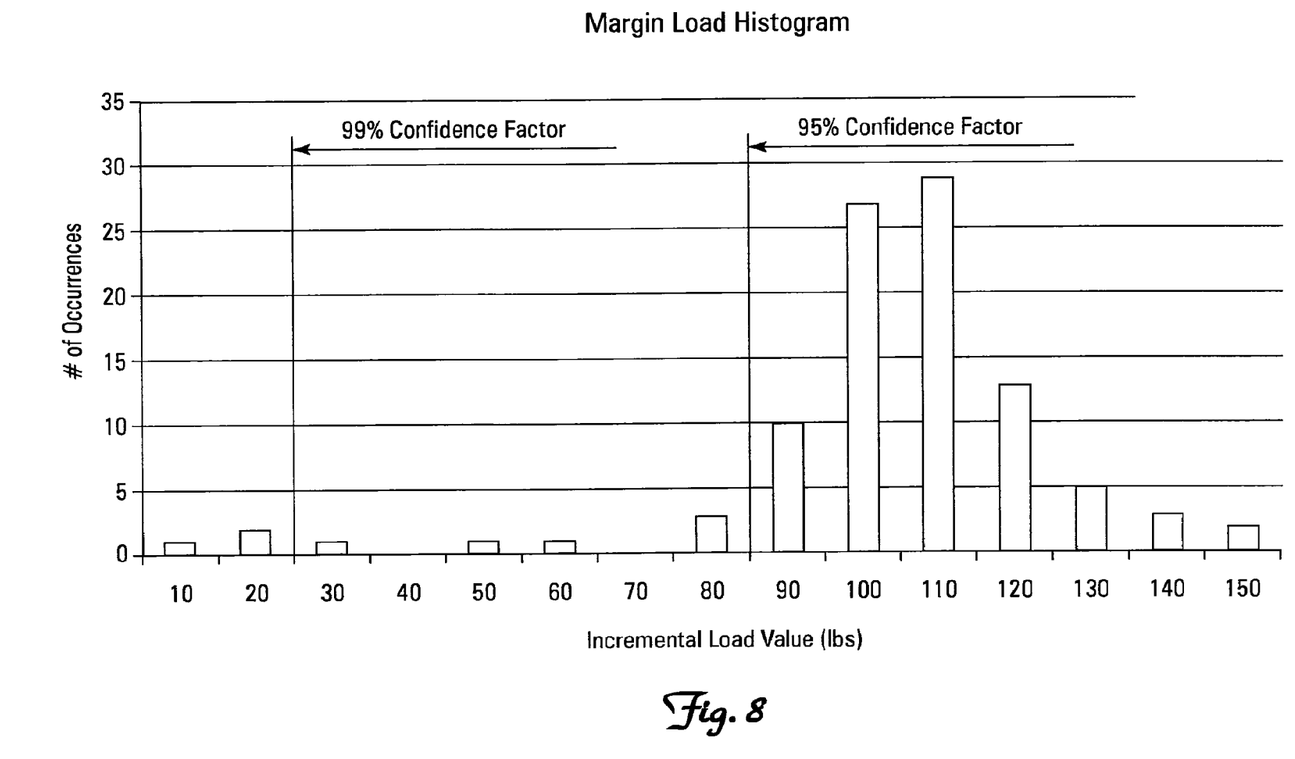
FIG. 8 is an example of a histogram of the calculated load averages sorted by incremental magnitude ranges and illustrates another method of determining load margin based on another statistical method utilizing a confidence factor.

Next a load margin scale, or histogram, such as illustrated in FIG. 8 is employed. The load margin scale is divided into substantially equal increments of load value magnitude ranges, for example ten pound increment ranges, such that the first increment is a magnitude range from 0 to 10 pounds, the second increment is from 10 to 20 pounds, the third increment is from 20 to 30 pounds, etc. through the increment of 140 to 150 pounds. Of course, the load value magnitude ranges and the scale may vary as needed depending on the anticipated load margins and the precision of the load margin desired. The calculated averages are then sorted among the load value magnitude ranges. For example, referring to FIG. 8, there was only one occurrence of a calculated load average of ten pounds during the entire time span. There were two occurrences of a calculated load average of twenty pounds; one occurrence of a calculated load average of thirty pounds; zero occurrences of a calculated load average of forty pounds; one occurrence at fifty pounds; one occurrence at sixty pounds; zero at seventy pounds; three at eighty pounds; ten occurrences of calculated load averages of ninety pounds; twenty-seven at 100 pounds; etc.

Next an ignore count is determined by multiplying the total count of sampling period occurrences by said confidence factor and subtracting the product from said total count of sampling period occurrences (i.e., ignore count=180−(180× 0.95)=9). Then, beginning with a lowest incremental load value magnitude range into which at least one of the sampling period occurrences has been sorted, and counting from left to right, the number of sampling period occurrences are counted until the count of sampling period occurrences equals the ignore count. The next lowest of the incremental load value magnitude ranges into which at least one of said sampling period occurrences has been sorted is selected as the load margin.

For example, referring to FIG. 8, with a 95% confidence factor resulting in an ignore count of nine, the derived load margin would be 90 pounds (i.e., the next incremental load value magnitude after ignoring nine occurrences). With a 97% confidence factor, the ignore count would equal five (i.e., 180−(0.97×180)=5.4), resulting in a derived load margin of 60 pounds. With a 99% confidence factor, the ignore count would equal two (i.e., 180−(0.99×180)=2) resulting in a derived load margin of 30 pounds. Based on the foregoing examples, it should be appreciated that by increasing the confidence factor, the more negative load spikes corresponding to aberrant soil conditions will be included in the statistical analysis, thus decreasing the derived load margin.

So that the operator can monitor how closely the load margin is being maintained to the minimum load threshold, the load margin (calculated or derived by any of the foregoing methods) is preferably displayed to the operator. The load margin may be displayed simply as a numerical value and/or graphically, such as by a bar graph or up/down arrows, or the like. The numeric or graphical display of the load margin may also utilize a color scheme whereby certain colors are associated with different magnitudes. For example, if the load margin is within an acceptable range, the displayed color may be green. If the load margin is slightly outside the desired range, but still within acceptable limits, the displayed color may be yellow. If, however, the load margin is outside acceptable limits, the displayed color may be red. Any combination of the foregoing may be utilized, such as a colored bar, colored up or down arrows, colored numerical values, etc.

An additional parameter that can provide further confidence to the operator that adequate depth is being maintained while minimizing soil compaction is by monitoring ground contact percentages. For example, if the ground contact percentage is high (e.g., above 95%), then it may be presumed that adequate but not excess supplemental downforce is being exerted on the row unit to ensure that the desired furrow depth is being maintained. However, if the ground contact percentage is low (e.g., less than 90%), it may be presumed that the supplemental downforce being exerted is inadequate to ensure the desired furrow depth. Of course the desired ground contact percentages that different operators consider to be indicative of excess or inadequate supplement downforce may be vary. As such the ground contact percentage is preferably an operator selectable parameter.

Figure 9:
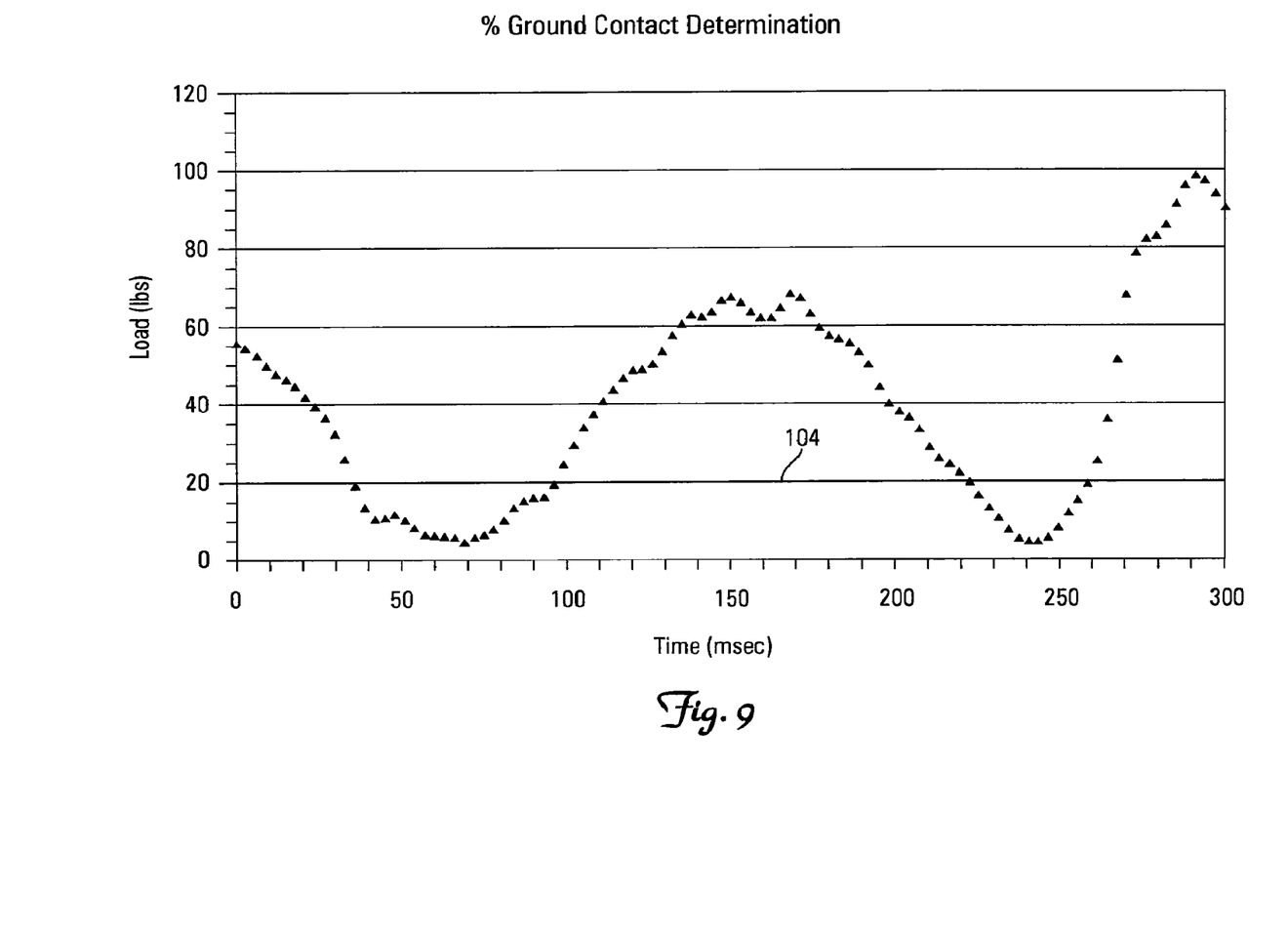
FIG. 9 is an example of a plot of detected load values over a sampling period with respect to a minimum load threshold to illustrate a preferred method of determining a ground contact parameter in accordance with the present invention.

FIG. 9 illustrates a plot of a series of load values detected at two millisecond time intervals over a sampling period of 300 milliseconds, resulting in a total of 150 data points. A minimum preset load threshold 104 of twenty pounds is shown in relation to these 150 data points. Load values less than the minimum load threshold 104 are presumed to indicate a loss of ground contact, whereas load values greater than the minimum load threshold 104 indicate that ground contact was present or maintained.

Knowing the total number of data points over the sampling period and knowing the number of those data points falling below the minimum load threshold 104, the percentage of ground contact can be easily calculated. Referring to FIG. 9, the first set of load values that are below the minimum load threshold 104 occur during the sampling period between 35 and 96 milliseconds, and account for 21 data points. The second set of load values that are below the minimum load threshold 104 occur during the sampling period between 222 and 258 milliseconds and account for 13 data points. Thus, a total of 34 data points out of 150 data points are less than the minimum load threshold 104, resulting in a ground contact percentage of only 77.3% (i.e., (150−34) 4150). If the operator sees that the ground contact percentage is less than desired, then the operator can increase the downforce on the row unit by increasing the supplemental down force 30.

As discussed previously, assuming the planter is traveling at 5 mph if ground contact is lost for less the forty milliseconds, the resulting loss in soil depth of the opener disc will be less than ⅛ inch—an agronomically insignificant amount.

Accordingly, in a preferred embodiment, the ground contact determination preferably utilizes the previously mentioned $T_{critical}$ duration of forty milliseconds, whereby, if the detected load value falls below the minimum load threshold 104 for less than $T_{critical}$, the data points are not counted in the ground contact percentage calculation. Thus, in the previous example of FIG. 9, the thirteen data points falling below the minimum load threshold 104 during the sampling period between 222 and 258 milliseconds (i.e. 36 milliseconds) are not counted. Using this alternative method, the calculated ground contact percentage is 86% (i.e., (150−21) 4150). If the planter is equipped to automatically adjust supplemental downforce, the supplemental downforce controller may be programmed to increase or decrease the supplemental downforce as needed to ensure that the ground contact percentage is at least equal to a desired ground contact percentage. It should be appreciated that while the foregoing example describes the ground contact parameter as a percentage, the ground contact parameter could instead be subtracted from 100% and the result could be reported instead as a "depth loss" parameter where 5% depth loss percentage is analogous to a ground contact percentage of 95%. Thus, for purposes of this description and the appended claims, any reference to ground contact parameter should be understood as also including or meaning depth loss or ground contact whether expressed as a percentage or any other form.

It should be appreciated that if both the ground contact parameter and the load margin (m) are being monitored, the operator will have even more confidence that furrow depth is being maintained while minimizing soil compaction. For example, if the load margin (m), calculated by any of the foregoing methods, is at or near zero, but the ground contact parameter falls appreciably below 100%, then the operator will know that additional supplemental downforce should be applied in order to maintain the desired furrow depth. If the planter is equipped to automatically adjust supplemental downforce, this logic may also be programmed into the supplemental downforce controller to increase or decrease the supplemental downforce to balance the load margin and the desired ground contact parameter to ensure that both the minimum ground contact parameter is being met as well as the minimum load threshold.

The foregoing description is presented to enable one of ordinary skill in the art to make and use the invention, and is provided in the context of a patent application and its requirements. Various modifications to the preferred embodiment of the system, and the general principles and features of the system and methods described herein will be readily apparent to those of skill in the art. Thus, the present invention is not to be limited to the embodiments of the system and methods described above and illustrated in the drawing figures, but is to be accorded the widest scope consistent with the spirit and scope of the appended claims.

The invention claimed is:

1. A method of determining when to adjust supplemental down force acting on a row unit of an agricultural planter to ensure desired furrow depth while minimizing soil compaction as the planter traverses a field, the row unit having a depth regulation member, the method comprising:
   (a) as the planter traverses the field, a load sensor generates load signal values variable in magnitude in relation to loading on the depth regulation member of the row unit, wherein said loading results from a force applied by the row unit to the soil surface as the planter traverses the field;
   (b) monitoring said load signal values occurring during a sampling period;

(c) from among said load signal values occurring during said sampling period, identifying a minimum load value, wherein said minimum load value is a load signal value with a lowest signal magnitude; and (d) calculating a load margin using said minimum load value, wherein said load margin is indicative of an amount of downforce on the row unit in excess of a desired downforce.

2. The method of claim 1 wherein said step of calculating a load margin includes subtracting a minimum load threshold from said minimum load value.

3. The method of claim 2 further comprising:
(e) displaying said calculated load margin on a visual display.

4. The method of claim 2 further comprising:
(e) adjusting the supplemental down force acting on said row unit to bring said calculated load margin toward zero.

5. The method of claim 2 wherein said minimum load threshold is less than twenty pounds.

6. The method of claim 5 wherein said minimum load threshold is an operator input.

7. The method of claim 5 wherein said minimum load threshold is an input received through a GPS map interface.

8. The method of claim 1 wherein said minimum load value corresponds to the lowest signal magnitude during said sampling period having a duration at least equal to a critical time duration.

9. The method of claim 8 wherein said step of calculating a load margin includes subtracting a minimum load threshold from said minimum load value.

10. The method of claim 9 further comprising:
(e) displaying said calculated load margin on a visual display.

11. The method of claim 9 further comprising:
(e) adjusting the supplemental down force acting on said row unit to bring said calculated load margin toward zero.

12. The method of claim 9 wherein said minimum load threshold is at least five pounds and said critical time duration is at least forty milliseconds.

13. The method of claim 12 wherein said minimum load threshold is an operator input.

14. The method of claim 12 wherein said minimum load threshold is an input through a GPS map interface.

15. The method of claim 1 wherein said minimum load value corresponds to the lowest signal magnitude during said sampling period after applying a low pass filter to said load signal values occurring during said sampling period.

16. The method of claim 15 wherein said step of calculating a load margin includes subtracting a minimum load threshold from said minimum load value.

17. The method of claim 16 further comprising:
(e) displaying said calculated load margin on a visual display.

18. The method of claim 16 further comprising:
(e) adjusting a supplemental down force acting on said row unit to bring said calculated load margin toward zero such that said loading is proximate said minimum load threshold.

19. The method of claim 16 wherein said minimum load threshold is less than twenty pounds.

20. The method of claim 19 wherein said minimum load threshold is an operator input.

21. The method of claim 19 wherein said minimum load threshold is an input through a GPS map interface.

22. The method of claim 1 further comprising:
(e) displaying said calculated load margin on a visual display.

23. The method of claim 22 wherein said display of said calculated load margin is a graphical display of said calculated load margin.

24. The method of claim 23 wherein said graphical display includes a bar graph of said calculated load margin.

25. The method of claim 24 wherein said bar graph utilizes a color scheme in which different predefined colors are displayed corresponding to predefined magnitude ranges of said calculated margin.

26. The method of claim 23 wherein said graphical display utilizes a color scheme in which different predefined colors are displayed corresponding to predefined magnitude ranges of said calculated margin.

27. The method of claim 1 wherein said step of monitoring said load signal values further includes detecting said load signal values at preset time intervals comprising said sampling period.

28. The method of claim 27 further comprising:
(e) calculating a ground contact parameter by counting occurrences of said detected load values that are less than a minimum load threshold and dividing said counted occurrences by the number of preset time intervals comprising said sampling period.

29. The method of claim 28 further comprising:
(f) displaying said calculated ground contact parameter as a percentage on a visual display.

30. The method of claim 28 further comprising:
(f) adjusting the supplemental down force acting on said row unit so that said calculated ground contact parameter at least meets a desired minimum ground contact parameter.

31. The method of claim 27 further comprising:
(e) calculating a ground contact parameter by identifying consecutive occurrences where said detected load signal values are less than a minimum load threshold;
(f) determining a duration of said identified consecutive occurrences where said detected load signal values are less than said minimum load threshold;
(g) comparing said duration to a critical time duration;
(h) counting all occurrences comprising said identified consecutive occurrences in which said duration is at least equal to said critical time duration; and
(i) dividing said counted occurrences by the number of preset time intervals comprising said sampling period.

32. The method of claim 31 further comprising:
(j) displaying said calculated ground contact parameter as a percentage on a visual display.

33. The method of claim 31 further comprising:
(j) adjusting the supplemental down force acting on said row unit so that said calculated ground contact parameter at least meets a desired minimum ground contact parameter.

34. A method of determining when to adjust supplemental down force on a row unit of an agricultural planter to ensure desired furrow depth while minimizing soil compaction as the planter traverses a field, the row unit having a depth regulation member, the method comprising:
(a) as the planter traverses the field, a load sensor generates load signal values corresponding to loading on the depth regulation member of the row unit wherein said loading results from a force applied by the row unit to the soil surface as the planter traverses the field;
(b) monitoring said load signal values occurring over a sampling period, wherein monitoring said load signal values includes detecting a load value magnitude at preset time intervals comprising said sampling period;
(c) deriving a load margin based on said detected load value magnitude, wherein said load margin represents an amount of down force on the row unit in excess of an amount of down force required to ensure a desired furrow depth, wherein said desired furrow depth is determined by a relative distance between said depth regulation member and an opening disc of the row unit; and
(d) displaying said derived load margin on a visual display.

35. The method of claim 34 further comprising:
(e) defining a deviation factor; and
wherein said step (c) of deriving said load margin includes:
(i) calculating an average load value for said sampling period from said detected load value magnitudes at said preset time intervals;
(ii) calculating a standard deviation of said detected load values during said sampling period;
(iii) multiplying said standard deviation by said deviation factor and subtracting the product thereof from said calculated average load value.

36. The method of claim 35 further comprising:
(f) adjusting a supplemental down force acting on said row unit to bring said derived load margin toward zero.

37. The method of claim 35 wherein said deviation factor is between about one and about five.

38. The method of claim 35 wherein said deviation factor is about 2.5.

39. The method of claim 34, wherein said load margin represents an amount of excess compaction caused by said depth regulation member.

40. The method of claim 34 further comprising:
(e) defining a confidence factor, said confidence factor, when presented in decimal form, being less than one;
wherein said step (c) of deriving said load margin includes:
(i) for a time span comprising a present number of sampling periods, calculating an average load value for each of said sampling periods from said load values detected at said preset time intervals;
(ii) storing in memory said calculated average load value for each said sampling period comprising said time span;
(iii) determining a total count of said sampling period occurrences comprising said time span;
(iv) determining an ignore count by multiplying said total count of sampling period occurrences by said confidence factor and subtracting the product from said total count of sampling period occurrences;
(v) ordering said calculated average load values by magnitude;
(vi) beginning with the lowest in magnitude of said ordered calculated average load values, counting in a direction of increasing magnitude the number of ordered calculated load margins until said count equals said ignore count; and
(vii) selecting as said derived load margin the next lowest in magnitude of said ordered calculated average load value after meeting said ignore count.

41. The method of claim 40 further comprising:
(f) displaying said derived load margin on a visual display.

42. The method of claim 40 further comprising:
(f) adjusting a supplemental down force acting on said row unit to bring said derived load margin toward zero.

43. The method of claim 40 wherein said confidence factor is between about ninety five percent and ninety nine percent.

44. The method of claim 34 further comprising:
(e) defining a confidence factor, said confidence factor, when presented in decimal form, being less than one;
wherein said step of deriving said load margin includes:
(i) for a time span comprising a present number of sampling periods, calculating an average load value for each of said sampling periods from said load values detected at said preset time intervals;
(ii) determining a total count of said sampling period occurrences comprising said time span;
(iii) defining a load margin scale divided into substantially equal increments of load value magnitude ranges;
(iv) sorting said sampling period occurrences by magnitude by assigning each of said calculated average load values to a corresponding one of said incremental load value magnitude ranges of said load margin scale;
(v) determining an ignore count by multiplying said total count of sampling period occurrences by said confidence factor and subtracting the product from said total count of sampling period occurrences;
(vi) beginning with a lowest one of said incremental load value magnitude ranges into which at least one of said sampling period occurrences has been sorted, counting each of said sorted sampling period occurrences within each of said incremental load value magnitude ranges until said count of sampling period occurrences equals said ignore count;
(vii) selecting as said derived load margin the next lowest of said incremental load value magnitude ranges into which at least one of said sampling period occurrences has been sorted after meeting said ignore count.

45. The method of claim 44 further comprising:
(f) displaying said derived load margin on a visual display.

46. The method of claim 44 further comprising:
(f) adjusting a supplemental down force acting on said row unit to bring said derived load margin toward zero.

47. The method of claim 44 wherein said confidence factor is between about ninety five percent and ninety nine percent.

* * * * *